April 20, 1943. J. B. DICKSON ET AL 2,317,182
INDICATING INSTRUMENT
Filed Jan. 16, 1941 2 Sheets-Sheet 1

INVENTORS
JOHN B. DICKSON AND
THOMAS L. HOLBROOK.
BY
ATTORNEYS.

April 20, 1943. J. B. DICKSON ET AL  2,317,182
INDICATING INSTRUMENT
Filed Jan. 16, 1941  2 Sheets-Sheet 2

INVENTORS
JOHN B. DICKSON AND
THOMAS L. HOLBROOK.
BY Harness, Dind, Pater & Harris,
ATTORNEYS.

Patented Apr. 20, 1943

2,317,182

UNITED STATES PATENT OFFICE 2,317,182

INDICATING INSTRUMENT

John B. Dickson, Highland Park, and Thomas L. Holbrook, Detroit, Mich., assignors to Chrysler Corporation, Highland Park, Mich., a corporation of Delaware Application January 16, 1941, Serial No. 374,658

11 Claims. (Cl. 240—2.1)

Our present invention relates to illuminated dials and pointers for indicating instruments, such as speedometers or the like. It is the principal object of the present invention to provide a dial and indicating pointer which may be read accurately and quickly in the dark.

An object of the present invention is to provide means whereby the numerals on a dial become lighted and glow in distinction to the face of the dial. A further object of the present invention is to provide means whereby the pointer of the indicating instrument glows in distinction to the face of the dial. In carrying out these objects of the invention, it is provided that only indirect illumination reaches the eye of the observer so as to avoid blinding the observer or causing eye fatigue.

A further object of the present invention is to provide means whereby the pointer of the indicating instrument will be caused to change color in accordance with desired requirements so as to give indication of various factors, such as speed of movement, etc., without requiring the observer carefully to note the numerals of the dial or the relative position of the indicating pointer.

It is the primary object of the present invention to provide means whereby light from a single source may illuminate the numerals of the dial by edgewise lighting and the pointer of the instrument by reflected light, such means comprising a prism incorporated in the face of the dial.

These and other objects and advantages of the present invention may be readily ascertained from a study of the accompanying specification and drawings wherein two forms of the present invention are disclosed in detail.

Figure 1:
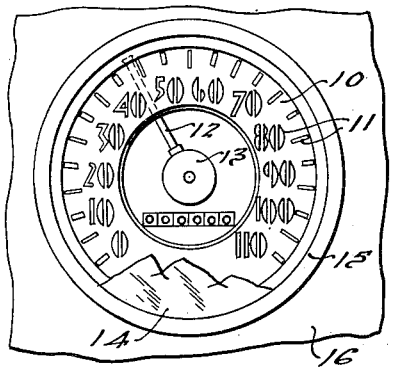
Fig. 1 is a view in elevation of a form of the present invention with a major part of the protective dial cover broken away.
Figure 2:
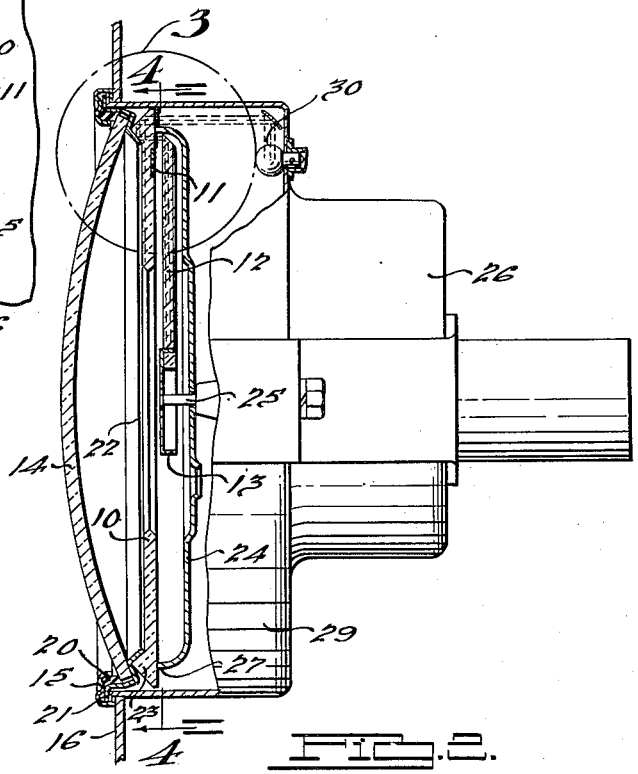
Fig. 2 is a side view of the complete instrument on an enlarged scale with parts broken away along the centerline.
Figure 4:
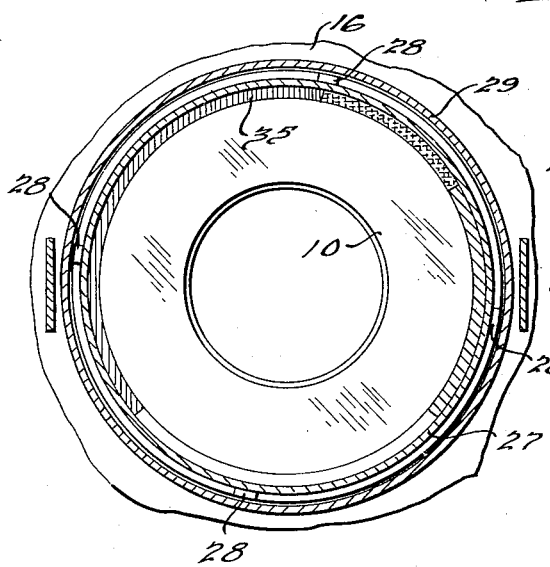
Fig. 4 is a sectional view taken substantially along line 4—4 of Fig. 2.
Figure 3:
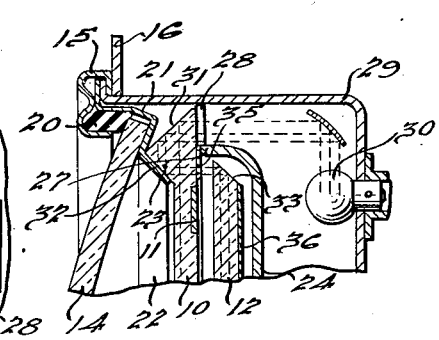
Fig. 3 is a partial sectional view of the bezel and other parts encircled at 3 in Fig. 2, the view being on a greatly enlarged scale.
Figure 5:
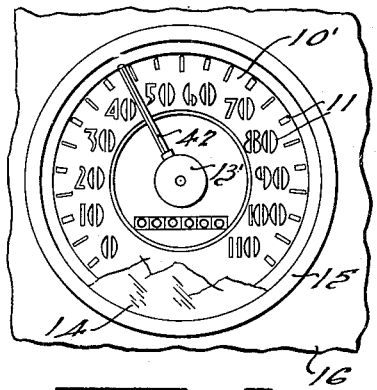
Fig. 5 is a view similar to Fig. 1 of a modified form of the invention.
Figure 6:
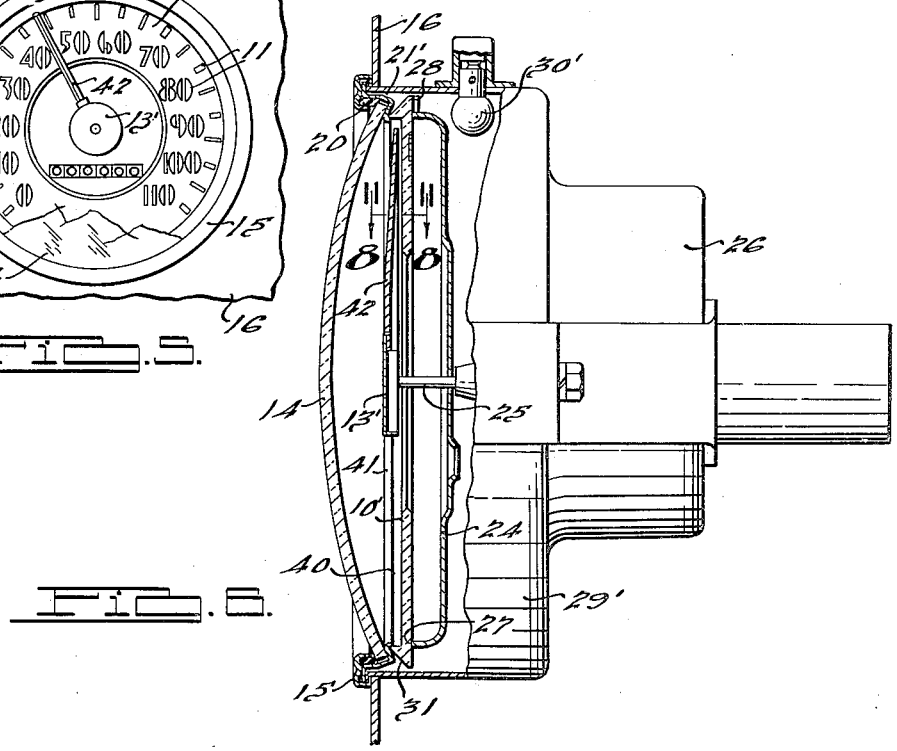
Fig. 6 is a view similar to Fig. 2 of the modification shown in Fig. 5.
Figure 8:
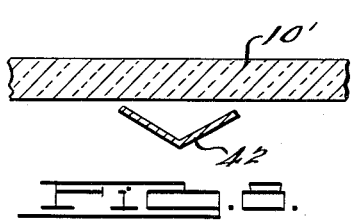
Fig. 8 is a sectional view on an enlarged scale taken substantially at 8—8 of Fig. 6.
Figure 7:
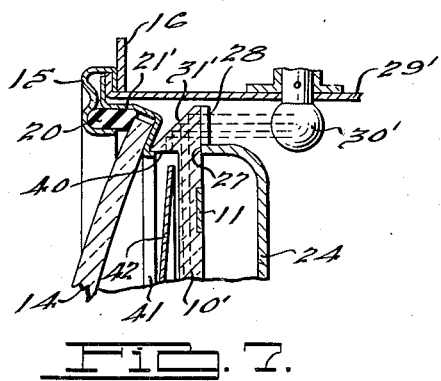
Fig. 7 is a view similar to Fig. 3 of the modification shown in Fig. 5.

In Figs. 1 to 4, inclusive, there is disclosed an indicating instrument comprising a dial 10 having indicia 11, past which travels a movable pointer 12 mounted on hub 13, the pointer preferably being formed of clear glass or plastic. The dial and pointer are preferably protected by a glass cover 14 mounted in a bezel 15 associated with the dashboard 16 or other mounting means. As seen in Figs. 2 and 3, the indicia 11, comprising spaced marks and numerals, are preferably recessed into the back surface of the dial 10, and the dial 10 preferably comprises a glass or clear plastic member. The recesses are filled with a light-reflecting substance, such as glass having opaque colors, an opaque plastic, an opaque enamel paint, or other material of similar nature. The indicia are thus visible through the clear cover plate 14 and the clear dial 10. The dial 10 may have a central aperture therethrough so as to cause the inner portion of pointer 12 to be clearly visible at all times.

The bezel 15 preferably comprises a rubber gasket 20 against which the outer surface of the cover plate 14 is retained by a retainer ring 21 having an inwardly dished inner flange 22. The cover plate 14 is preferably convex so that the portion of the retainer ring 21 embracing the edge of the cover plate slopes outwardly toward the observer and forms a groove with the inner flange 22. The dial 10 is provided with a prismatic edge portion 23 encompassing the dial, with the base of the prismatic edge portion lying in the plane of the rear surface of the dial in which the indicia 11 are positioned and the point of the prismatic portion lying in the groove formed in the retainer ring 21. A backing member 24 is provided, the member having a central aperture through which the shaft 25 of the indicating instrument 26 passes. The backing member is preferably shaped like a saucer with the edge 27 thereof resting against the rear surface of the dial directly behind the point of the prismatic portion 23, and the member is provided with a plurality of narrow lugs 28 extending beyond the edge thereof to provide means to space the backing member in the cup-like portion 29 of the indicating instrument.

A light 30 is mounted in the cup-like portion 29, and so positioned with respect to a reflector 30' extending around a corner portion of the casing 29 as to concentrate, by specular reflection, light from the lamp 30 directly upon the back face of the prism 23. Preferably, the light is placed adjacent the portion of the dial past which the pointer travels most of the time, so that the pointer will be illuminated brightly during most of the periods when it will be under observation. Reflected light from the light bulb 30 travels past the edge 27 of the backing member 24, strikes the reflecting surface 31 of the prismatic portion 23, and is reflected against the reflecting surface 32 of the prismatic portion 23 so as to be reflected back through the dial 10 parallel to the light rays from the source of light. The angles of inclination of the surfaces 31 and 32 are preferably made 45° for this purpose and in order that some of the light will be reflected from the surface 31 vertically through the dial 10. The light which travels vertically through the dial illuminates the edges and outer surfaces of the indicia 11. The light which is reflected back through the dial is reflected by the prism surface 33 of the end of pointer 12, which is preferably also at an angle of 45° to the surface of the dial so that this light travels longitudinally of the pointer 12. A translucent band 35 of colored paint, glass or plastic is preferably placed on the rear surface of the dial directly behind the reflecting surface 32 inside of the edge 27 of the retaining member 24, the band being of different colors at different portions of the periphery of the dial, such as green, amber and red, in order to give warning of excessive speed or to indicate safe speeds. Therefore, the light which travels through the pointer 12 will be colored so as to cause the color of the pointer to indicate the extent of speed or other factors for which the instrument may be designed. In order that the pointer may stand out clearly in the dark, it is preferably backed by a layer of white paint 36 or other material which will glow with the color of the band 35 adjacent the tip of the pointer.

Figs. 5 to 8, inclusive, illustrate a modified form of the device in which the prismatic portion of the dial 10' comprises a reflecting surface 31' at 45° to the rear surface of the dial, but in which the opposed reflecting surface is omitted and all of the light from the surface 31' is transmitted vertically through the face of the dial or through the face 40 formed vertically to the front face of the dial and extending to the outer tip of the surface 31'. In order that light may be transmitted directly through face 40 across the front of the dial, the retainer ring 21' is provided with a very narrow bead 41 forming a shallow groove in which the tip of the prismatic portion is retained. In this modification the pointer 42 comprises an opaque member, such as a thin strip of metal, which is formed in V-shape with the point of the V facing outward and the ends of the V being closely adjacent the outer face of the dial 10'. Also, the depth of the V preferably decreases progressively from adjacent the hub 13' to the end of the pointer so that light passing through the face 40 will fall on the outer surface of the pointer 42 throughout its extent. The face 40 may be colored so as to produce a desired glow of color or combinations of color in the path of the pointer. In this form of the invention the lamp 30' may be located at any desired position such as in the side wall of the casing 29' and the interior of the casing is preferably provided with a light coloration so as to distribute the light by diffuse reflection from a single source. Otherwise this modification of the device is exactly similar to that previously described.

Having illustrated and described two forms of the present invention, it should be apparent to those skilled in the art that modifications in arrangement and detail may be devised. All such modifications as come within the scope of the following claims are considered to be a part of my invention.

We claim:

1. An indicating instrument comprising a transparent dial including an indicia bearing portion, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion, the apex of said extension projecting forwardly beyond the front surface of said indicia bearing portion, said extension comprising a reflecting surface so arranged as to transmit light through the plane of said dial toward the central portion thereof and a second surface so arranged as to transmit light externally of said dial, a movable pointer arranged to travel across a surface of said dial and to be illuminated by light transmitted from said second surface, and a positioning member for said dial having a groove receiving the apex of said extension.

2. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion comprising a reflecting surface so arranged as to transmit light through the plane of said dial toward the central portion thereof and a second surface so arranged as to transmit light externally of said dial across the front surface thereof, and a movable pointer arranged to travel across the front surface of said dial and in the path of light transmitted from said second surface.

3. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surace of all but a peripheral portion thereof, a prismatic extension on the front surface of said dial adjacent said peripheral portion comprising a reflecting surface so arranged as to transmit light through the plane of said dial toward the central portion thereof and a second surface so arranged as to reflect light rearwardly through said dial and the rear surface thereof, and a movable pointer arranged to travel across the rear surface of said dial, said movable pointer having its tip portion extending into the light transmitted from said second surface.

4. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion comprising a reflecting surface so arranged as to transmit light through the plane of said dial toward the central portion thereof and a second surface so arranged as to reflect light rearwardly through said dial and the rear surface thereof, and a movable pointer arranged to travel across the rear surface of said dial, said movable pointer having its tip portion extending into the light transmitted from said second surface and comprising a transparent substance adapted to be illuminated by light intercepted by said tip portion.

5. An indicating instrument comprising a cup-shaped member, a source of light within said cup-shaped member, a reflecting prism arranged adjacent the edge of the open end of said cup-shaped member with its apex pointing outward so that light from said light source may be reflected internally from one side surface thereof to the opposed side surface and back toward said source of light, a shield so arranged with respect to said opposed side face that light directed to the latter is obstructed from view from the front side of said instrument, and a pointer so arranged as to be illuminated by that light reflected back toward said source as aforesaid.

6. An indicating instrument comprising a cup-shaped member, a source of light within said cup-shaped member, a reflecting prism arranged adjacent the edge of the open end of said cup-shaped member with its apex pointing outward so that light from said light source may be reflected internally from one side surface thereof to the opposed side surface and back toward said source of light, a shield so arranged with respect to said opposed side face that light directed to the latter is obstructed from view from the front side of said instrument, and a pointer so arranged as to be illuminated by that light reflected back toward said source as aforesaid, said pointer being formed of a transparent substance and comprising a prismatic tip portion arranged to intercept light from said prism and to reflect the light longitudinally of said pointer.

7. An indicating instrument comprising a cup-shaped member, a source of light within said cup-shaped member, a reflecting prism arranged adjacent the edge of the open end of said cup-shaped member with its apex pointing outward so that light from said light source may be reflected internally from one side surface thereof to the opposed side surface and back toward said source of light, a shield within said cup-shaped member having its edge terminating directly behind the apex of said prism so that light reflected from the opposed side surface of the prism illuminates the outwardly facing surface of the periphery of said shield, and a pointer arranged within said shield so as to be illuminated by the light reflected against said shield, said pointer being formed of a transparent substance and comprising a prismatic tip portion arranged to intercept light from said prism and to reflect the light longitudinally of said pointer, said pointer having a light reflective backing so as to make the same visible against said shield.

8. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion comprising a reflecting surface so arranged as to transmit light through the plane of said dial toward the central portion thereof and a second surface so arranged as to transmit light externally of said dial across the front surface thereof, a movable pointer arranged to travel across the front surface of said dial and in the path of light transmitted from said second surface, and indicia sunk into a surface of said dial so as to be illuminated by the light transmitted through the body of said dial toward the central portion thereof.

9. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion comprising a reflecting surface so arranged as to transmit light through the plane of said dial toward the central portion thereof and a second surface so arranged as to reflect light rearwardly through said dial and the rear suface thereof, a movable pointer arranged to travel across the rear surface of said dial, said movable pointer having its tip portion extending into the light transmitted from said second surface, and indicia sunk into a surface of said dial so as to be illuminated by the light transmitted through the body of said dial toward the central portion thereof.

10. An indicating device comprising a housing, a light source in said housing, a dial in said housing including an indica bearing portion and a prismatic extension on the front surface adjacent the outer periphery thereof arranged in light receiving relation with respect to said source of light, said extension comprising a reflecting surface so arranged as to transmit light received from said source through the plane of said indicia bearing portion toward the central region thereof, and a second surface extending forwardly of said indicia bearing portion adapted to transmit light externally of said dial, an indicator adapted for movement across a surface of said dial and illuminable by light transmitted by said second surface, a transparent cover for said dial, and retaining means for said cover and said dial including a member encompassing said cover and having a grooved portion disposed between said cover and said prismatic extension and receiving the apex of the latter, said grooved portion having an opaque wall so registering with said reflecting surface as to obstruct viewing of the latter from the front of the instrument.

11. An indicating instrument comprising a transparent dial, a cup-shaped member having said dial placed across the open end thereof, a source of light within said cup-shaped member, a backing member behind said dial and having its edge close to but spaced from the periphery of said dial so as to prevent direct illumination of the rear surface of all but a peripheral portion thereof, a prismatic extension on the front surface of said dial adjacent said peripheral portion comprising a reflecting surface so arranged as to transmit light through the plane of said dial toward the central portion thereof, and a second surface so arranged as to reflect light rearwardly through said dial and the rear surface thereof, a movable pointer arranged to travel across the rear surface of said dial, said movable pointer having its tip portion extending into the light transmitted from said second surface, and a positioning member for said dial having a grooved portion receiving the apex of said prismatic extension, said grooved portion having walls so registering with respective reflecting surfaces of said extension as to obstruct viewing of the latter from the front side of the instrument.

JOHN B. DICKSON.
THOMAS L. HOLBROOK.